United States Patent [19]
Clark

[11] Patent Number: 6,153,944
[45] Date of Patent: Nov. 28, 2000

[54] APPARATUS FOR GENERATING ELECTRICITY FROM FLOWING FLUIDS

[76] Inventor: Robert O. Clark, 57 Arrowhead Trail, Tijeras, N. Mex. 87059

[21] Appl. No.: 09/437,720

[22] Filed: Nov. 9, 1999

[51] Int. Cl.[7] ....................................................... F03B 3/00
[52] U.S. Cl. ................................. 290/54; 290/55; 416/79
[58] Field of Search ................................. 290/42, 43, 44, 290/53, 54, 55; 416/79, 80, 81

[56] References Cited

U.S. PATENT DOCUMENTS

| | | |
|---|---|---|
| 3,546,473 | 12/1970 | Rich . |
| 3,604,942 | 9/1971 | Nelson . |
| 3,696,251 | 10/1972 | Last et al. . |
| 3,978,345 | 8/1976 | Bailey . |
| 4,024,409 | 5/1977 | Payne ........................................ 290/55 |
| 4,110,630 | 8/1978 | Hendel . |
| 4,145,885 | 3/1979 | Solell ........................................ 60/504 |
| 4,146,800 | 3/1979 | Gregory . |
| 4,148,805 | 4/1979 | Arnold . |
| 4,191,893 | 3/1980 | Grann et al. . |
| 4,260,901 | 4/1981 | Woodbridge . |
| 4,265,086 | 5/1981 | Bahrenburg . |
| 4,347,036 | 8/1982 | Arnold ........................................ 416/1 |
| 4,348,594 | 9/1982 | Lipfert . |
| 4,368,392 | 1/1983 | Drees . |
| 4,423,334 | 12/1983 | Jacobi et al. . |
| 4,476,397 | 10/1984 | Lawson . |
| 4,494,009 | 1/1985 | Yukl . |
| 5,324,169 | 6/1994 | Brown et al. ............................. 416/83 |
| 5,548,956 | 8/1996 | Price . |
| 5,552,657 | 9/1996 | Epstein . |
| 5,744,871 | 4/1998 | Akesolo . |

*Primary Examiner*—Nick Ponomarenko
*Attorney, Agent, or Firm*—Rod D. Baker

[57] ABSTRACT

An apparatus for generating electricity from aeolian oscilaltions caused by the flow of a fluid such as wind or water. An immobile beam extends between two piers, and a movable vane is disposed around the beam in parallel relation thereto. The vane is generally tubular, having a generally cylindrical or foil-shaped cross section. The movement of a fluid, such as wind or deep ocean tidal flow, past the vane induces aeolian oscillation in the vane, so that the vane moves to-and-fro, with respect to the beam, in a direction generally perpendicular to the direction of fluid flow. Rods and a crankshaft may connect the vane to a generator mounted upon the beam, so that the movement of the vane is converted into electricity. Alternatively, electricity can be generated from the movement of the vane by a field coil on the vane inducing electrical current in induction wires mounted upon the immobile beam.

9 Claims, 7 Drawing Sheets

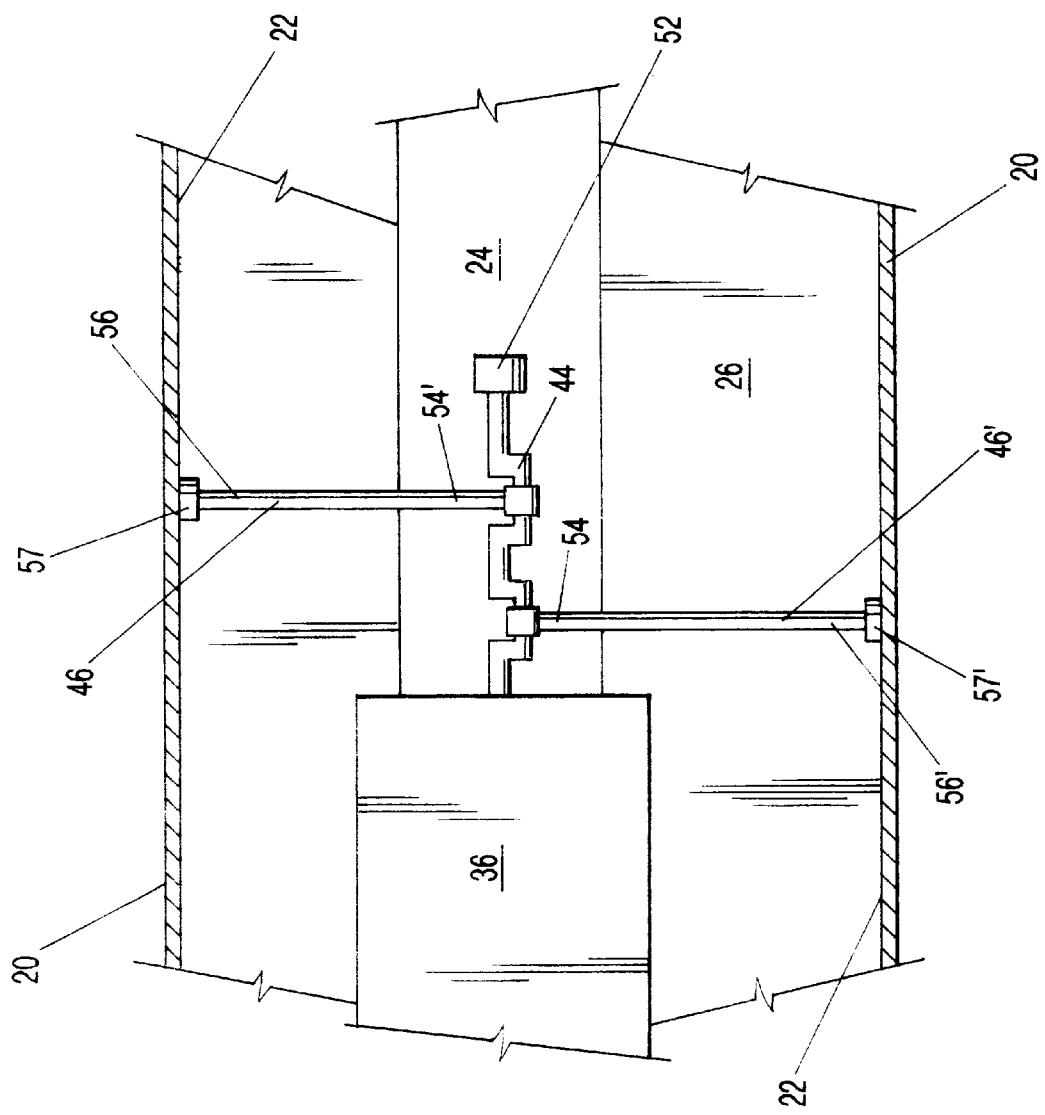

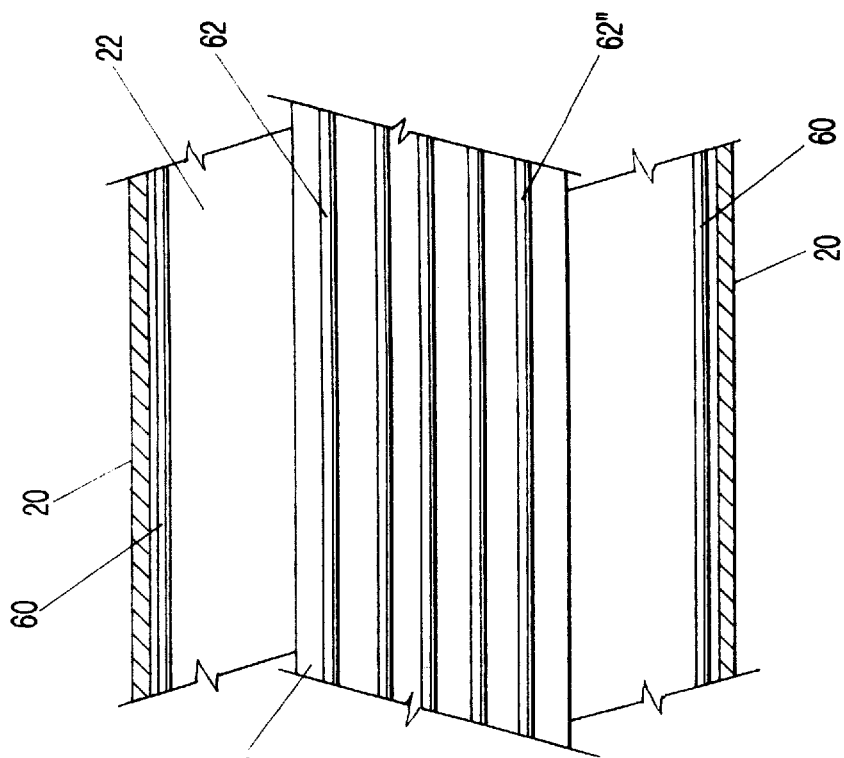
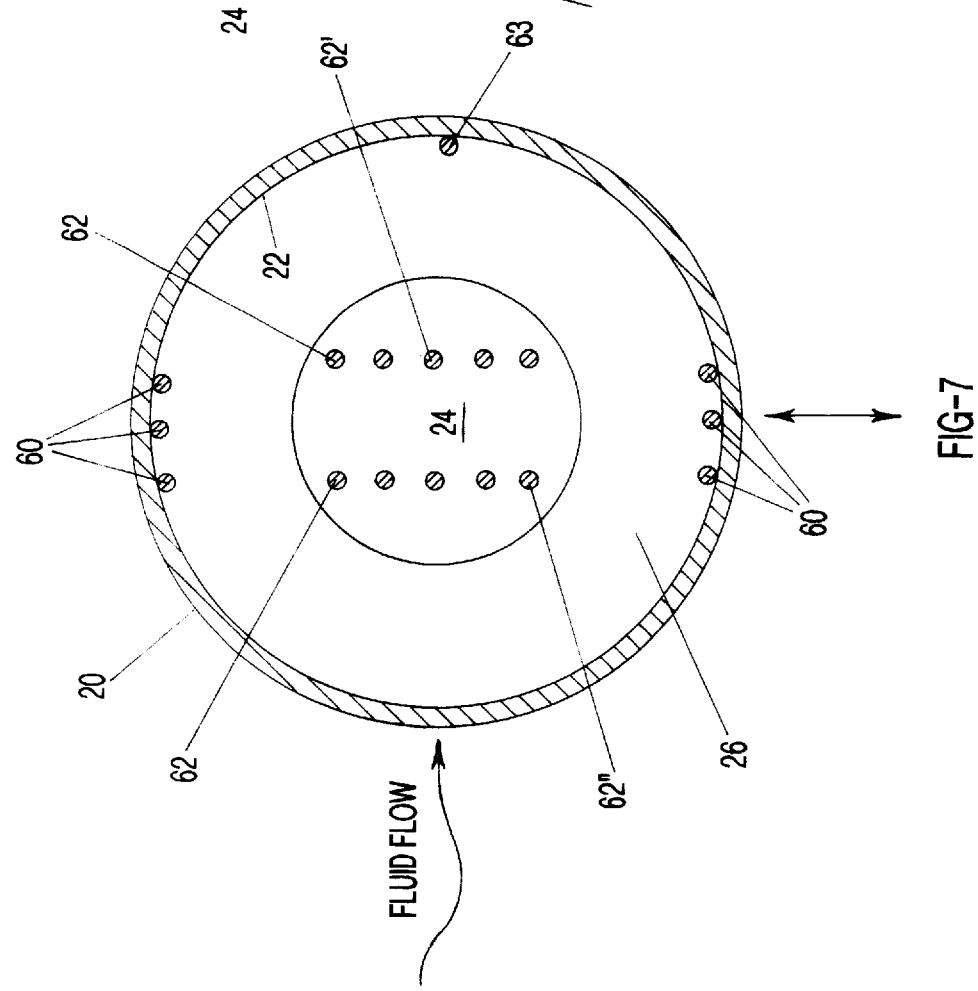

APPARATUS FOR GENERATING ELECTRICITY FROM FLOWING FLUIDS

BACKGROUND OF THE INVENTION

1. Field of the Invention (Technical Field)

The present invention relates to apparatus for generating electricity from the movement of flowing fluids, and thus is related generally to windmill and water mill devices, and more particularly relates to an apparatus for generating electricity from aeolian oscillations due to ocean tides or wind.

2. Background Art

Windmills and water mills have been used for centuries to harness the kinetic energy of wind and flowing water. Historically, most wind and water mills have involved devices incorporating fins or paddles. The fins or paddles are disposed mostly normal to the direction of wind or water stream flow, and upon some type of an axle, with the result that the force of the wind or water flow impinging against the fins or paddles induces a rotary motion of the axle. The rotating axle is then connected to some additional device for accomplishing work, such as a pump, electrical generator, millstone, or the like. More recently, the use of sophisticated turbines, particularly in hydroelectric dams, has permitted more efficient harnessing of wind or water flow. Even highly developed turbines, however, tap the force generated by a flowing fluid driving a paddle- or propeller-like device to cause rotary motion.

With energy demands increasing worldwide, there is a rising need for an apparatus for generating power from naturally occurring fluid flow, There is a special need for a system that can harness wind or water flow in areas of marginal potential for efficient energy production, e.g. areas of mild or only moderate winds, or locations of relatively slow water flow velocities (such as deep ocean tidal flows). A shortcoming of many known devices for harnessing natural fluid flow is their fundamental reliance upon conventional "paddle" or "fin" devices for converting linear fluid flow into rotary mechanical motion. The use of fins and paddles to create rotary motion, for generators and the like, limits the locations where these known devices may be deployed, as rotary devices generally require comparatively high wind or water flow velocities.

It has been known for at least a century that a generally cylindrical object, such as a wire disposed in tension between two anchors, will vibrate or oscillate if placed in a moving fluid, such as the wind, due to the effect of the fluid flowing past and around the object. Particularly in the case of objects oscillating in the flow of rushing wind, the phenomenon has been referred to as "aeolian oscillation." Aeolian oscillation refers generally to the oscillation of an object, typically but not necessarily an object having a cylindrical cross section, caused by the movement there past of a flowing fluid such as air (wind) or water. Experiments reported in the late 1800's by J. W. Rayleigh involved moving various diameter wires through air while measuring the aeolian tone frequencies generated by the vibrating wire. It was empirically demonstrated that a cylindrical object will oscillate at a frequency N in wind moving at velocity V according to the formula $$N = \frac{V}{5d} \quad (1)$$

where N is in cycles per second and the constant 5 is satisfied for wind velocity V and wire diameter d in the centimeter-grams-seconds system of units. Using the formula, wire-stringed wind harps may be designed to produce tones at certain pitches at particular wind velocities.

An advantage of aeolian oscillation is that oscillation can be induced at relatively low fluid flow velocities. An aeolian oscillation of significant magnitude can be generated in a wind too mild to turn a conventional windmill.

Against the foregoing background, the present invention was developed to harness the kinetic energy of a flowing fluid, whereby aeolian oscillatory motion is converted into electrical energy. The only previous effort, of which this applicant is aware, to harness the energy of aeolian oscillation is the device described in U.S. Pat. No. 4,024,409 to Payne.

SUMMARY OF THE INVENTION
(DISCLOSURE OF THE INVENTION)

Broadly described, the invention employs a tubular vane in the flow of air or water to develop strong aeolian oscillation to generate electricity. A fluid mechanical process akin to that which generates the lift of an airplane wing—laminar flow over a curved surface, the flow unable to maintain contact with the surface, resulting in reduced pressure on the surface—is exploited by the apparatus of the invention. A similar process applies to the curved surface of the tubular vane of the apparatus, but on both "sides" of the tube, resulting in alternating pressure drops on either side of the tube, which in turn induces the oscillatory motion of the vane. The rough correspondence of a cylindrical tube with the airfoil of an airplane wing indicates an alternative embodiment of the invention, wherein the vane has an airfoil shaped cross section, rather than a simply cylindrically shaped cross section. An airfoil shaped vane, having a semi-cylindrical leading edge followed by a downstream pair of converging planar surfaces, produces an oscillatory force sufficient to drive a generator.

There is provided according to the invention an apparatus for generating electricity from the kinetic energy of a flowing fluid in which the apparatus is located, the apparatus comprising immovable beam, a rigid tubular vane having an interior wall defining an interior space, the tubular vane disposed around the beam, wherein the beam is situated parallel within the vane, and the vane is movable in relation to the beam, and the flowing of the fluid past the vane causes the vane to oscillate in relation to the beam. Also included is a means for limiting the motion of the vane to unidimensional translational movement wherein the axes of the beam and the vane remain parallel, and means for generating electrical energy from the movement of the vane in relation to the beam. The apparatus preferably further comprises a pair of support piers, with the beam fixedly extends between the piers. Most preferably, the piers are vertically disposed, and the beam extends horizontally between the piers. Flexible boots extend between the ends of the vane and the piers to prevent the entry of foreign matter into the interior space within the vane. The tubular vane may have a substantially cylindrical cross sectional profile, or may have a generally foil-shaped cross-sectional profile. The means for limiting the motion of the vane comprises a pair of parallel guide members mounted within and upon the vane on opposite sides of the beam, and rotatable bearings upon opposing sides of the beam, the bearings in constant contact with the guide members. Alternatively, two parallel beams are disposed longitudinally within the vane, and the means for limiting motion of the vane comprises a pair of parallel guide members mounted within and upon the vane and between the two beams, rotatable bearings upon one side of each of the beams, the bearings in constant contact with the guide members.

In one embodiment, the means for generating electrical energy comprises a generator upon the beam, a crankshaft operably connected to the mechanical input of the generator, and at least a pair of rods having their respective first ends connected to the crankshaft, and respective second ends pivotally connected to diametrically opposing points upon the interior wall of the vane, so that when the vane oscillates in relation to the beam, the rods impart rotary motion to the crankshaft, causing the generator to produce electrical current. Alternatively, the means for generating electrical energy comprises a field coil upon the vane, a direct current flowing in the coil, and a plurality of induction wires mounted longitudinally upon and insulated from the beam, so that when the vane oscillates in relation to the beam, the magnetic flux field emanating from the field coil moves across the induction wires, thereby inducing electrical current in the induction wires.

A primary object of the present invention is to provide an apparatus which generates electricity from the kinetic energy of a fluid flowing past an object and inducing aeolian oscillation in the object.

A primary advantage of the present invention is that it is functional at comparatively low fluid flow velocities.

Another advantage of the invention is its simplicity.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 3 is an enlarged sectional front view of a portion of the embodiment depicted in FIG. 2;

FIG. 7 is an enlarged radial sectional view of a portion of an alternative embodiment of the apparatus of the invention; and FIG. 8 is a front sectional view of the portion of the alternative embodiment depicted in FIG. 7.

DESCRIPTION OF THE PREFERRED EMBODIMENTS

BEST MODES FOR CARRYING OUT THE INVENTION

The invention has to do with the generation of electrical energy by tapping the forces of the wind or ocean tides. Thus, it is involved with the general fields of windmills and water mills. Importantly, the invention is an "aeolian" device. It is quite distinguishable from conventional wind or water mills, which typically involve placing some type of vane or paddle into the flowing fluid to cause rotary motion.

In the invention, the driving fluid does not induce any rotational movement in the inventive apparatus, but instead causes a principal component of the apparatus to oscillate. Also, the invention is not driven by wave action, and does not derive power from pulses or gusts; the device may be driven by a constant flow of water or wind.

Briefly summarized, the inventive apparatus has one or more tubular vanes (which may be somewhat "wing-shaped"), that are mounted to be capable of to-and-fro motion in a single plane containing the axis of the vane. Stated differently, each vane does not "roll" and cannot rotate or revolve, but rather is confined to move in one dimension only in a plane containing the axis of the vane; during motion of each vane, the ends of the vane move along respective parallel straight lines.

In operation of the apparatus, the wind or water moving past and around each vane gives rise to an aeolian effect, whereby the vane begins to oscillate at a natural frequency (which is a function mainly of vane diameter and fluid speed). The vane can be connected to the input of a generator by a crankshaft arrangement, so that the oscillation of the vane is translated into rotary input to the generator. Alternatively, in an embodiment having less inertial and frictional losses, the oscillation of the vane moves a set of induction wires back-and-forth within a DC electrical field coil to induce a current. In the preferred embodiment, the ends of the vanes move, i.e. the entire vane length undergoes a uniform lateral displacement; independent constraining components limit the translation of the vane to a distance approximating the oscillation amplitude.

Figure 1:
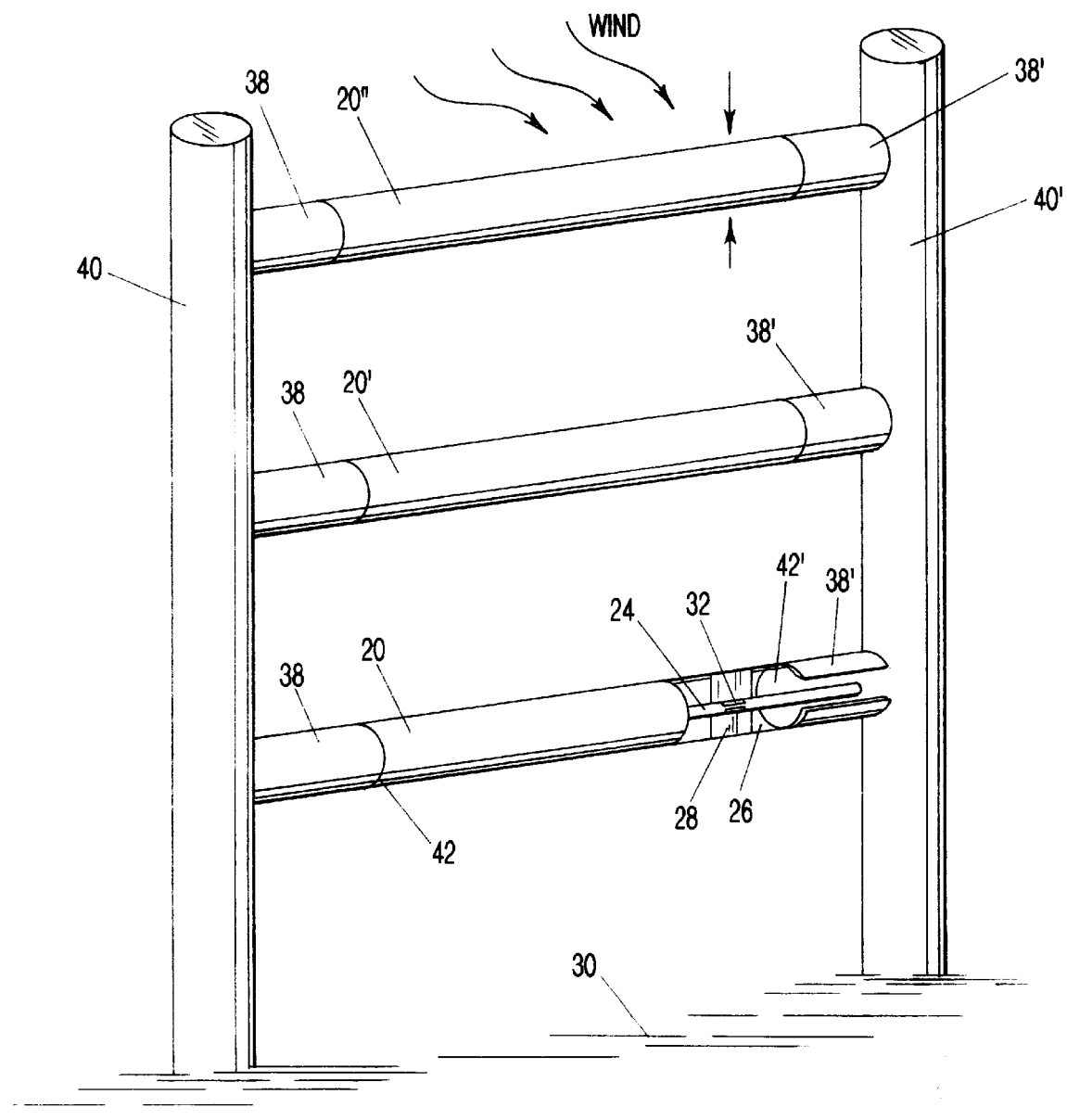
FIG. 1 is a perspective view of a preferred embodiment of the apparatus of the invention, showing three tubular vanes disposed between vertical piers, and a portion of one vane broken away to reveal certain interior elements.

Attention is invited to FIG. 1, an overall view of a preferred embodiment of the apparatus of the invention. Three vanes 20, 20', 20" are disposed horizontally between a pair of parallel vertical piers 40, 40'. FIG. 1 depicts an embodiment having three vanes 20, 20', 20", but it is understood that the apparatus may include any number of vanes disposed upon supporting piers. One vane 20 may be employed, or several vanes deployed upon a pair of piers 40, 40'. It is further noted that alternative embodiments of the invention may use a single pier, the function of the pier or piers being to substantially fixedly support the vane or vanes 20, 20', 20" in relation to the seabed or ground 30. Moreover, the practice of the invention may involve the deployment of a plurality of apparatus assemblies such as that shown in FIG. 1 in order to generate large quantities of energy. In the preferred embodiment, the vanes 20, 20', 20" are disposed generally parallel to the ground 30 to minimize ground effects upon the flow of wind or water past the vanes. However, in alternative embodiments, the vanes 20, 20', 20" may be disposed in vertical relation to the seabed or ground 30. In the figures, the flow of "wind" is illustrated. The invention also is suited for use in moving water, particularly in low-velocity, high volume discharges such as ocean tidal flow. Thus, the invention is useable to generate power from the kinetic energy of any flowing fluid in which the apparatus is located, including but not limited to the wind and ocean flows.

Figure 2:
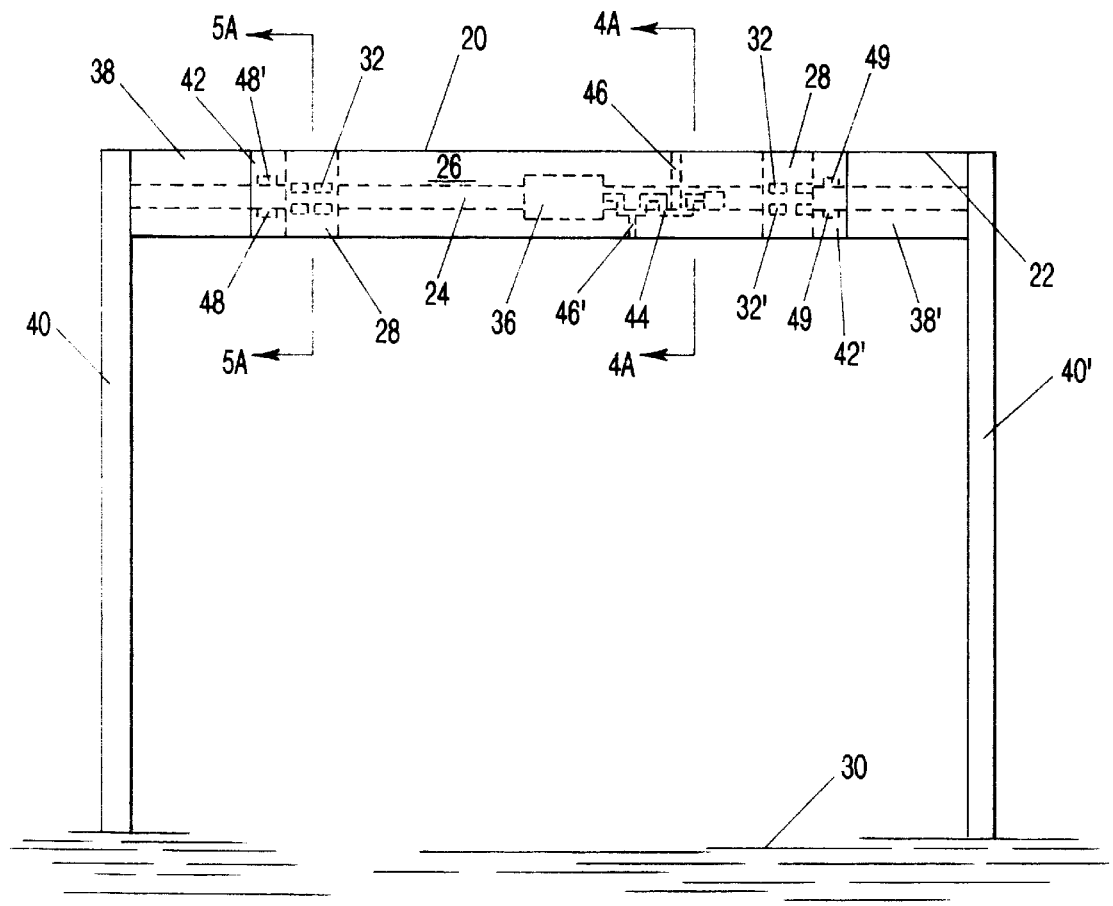
FIG. 2 is a front elevation view of the apparatus of the invention, showing one tubular vane disposed between vertical piers, and certain interior elements depicted with phantom lines.

Combined reference is made to FIGS. 1 and 2, FIG. 2 showing an embodiment of the invention having a single vane 20 horizontally disposed between two vertical piers 40, 40'. Hereafter in this specification, the description of the configuration and operation of a single vane 20 will serve to describe other vanes that may be present in a particular assembly. Each vane 20 is disposed between piers 40, 40' by means of at least one beam 24 fixedly extending between the piers 40, 40'. When the piers 40, 40' are vertically disposed, the beam 24 extends horizontally between them. Piers 40, 40' preferably are provided with an aerodynamically streamlined profile with respect to the prevailing direction of fluid flow in order to minimize fluid turbulence.

In the preferred embodiment, a single beam 24 is employed; however, in alternative embodiments a pair of beams (FIG. 5B) may be used. The ends of each beam 24 are fixedly secured to the piers 40, 40', so that the beam is substantially immovable, in relation to the fluid flow, during operation of the invention. Referring to FIGS. 1–4B, it is seen that each vane 20 is a rigid tube having an interior wall 22 defining an interior space 26. The vane 20 tube may be made of practically any durable, substantially rigid material, such as plastic or aluminum. In one preferred embodiment, the vane 20 is a thin-walled tube of stainless steel. The tubular vane 20 is disposed around the beam 24, so that the beam is situated parallel within the vane 20, as suggested by FIGS. 1–4B. The vane 20 is movable in relation to the beam 24, as the vane oscillates (in relation to the beam) in a plane generally perpendicular to the direction of the fluid flow, as indicated by the directional arrows at vane 20 of FIG. 1. An advantage of the invention is that the ends of the vane 20 are not secured to the beam, but oscillate with the vane to minimize the force required to compel oscillatory movement.

As generally indicated by the figures, but best seen in the sectional views of FIGS. 4A, 4B, 5A, and 5B, each vane 20 is generally characterized as a tube, and preferably has a substantially cylindrical cross sectional profile. A strictly tubular cross sectional profile is not essential, however, and a tubular vane 20 having an oval or elliptical cross sectional profile may function in the apparatus of the invention. As mentioned, the tubular vane 20 has an interior wall 22 which defines an interior space 26 in which elements of the apparatus to be explained are situated.

FIG. 2 is a front elevation view of a one-vane embodiment of the apparatus. The figure illustrates, by the use of phantom lines, how certain elements of the invention are disposed within the tube of the vane 20. The beam 24 extends past the ends 42, 42' of the rigid vane 20 to connect with the piers 40, 40'. A pair of flexible boots 38, 38' extend between the respective ends 42, 42' of the vane 20 and the piers 40, 40'. The boots 38, 38' preferably are made from an elastically flexible material, and preferably have substantially water- and/or air-proof seals at their points of connection to the ends 42, 42' of the vane 20 and to the piers 40, 42'. Accordingly, the boots 38, 38' serve as protective sealed barriers to prevent the entry of water, debris, or foreign matter into the interior space 26 within the vane 20. The flexibility of the boots 38, 38' permits the ends 42, 42' of the vane 20 to move with respect to the piers 40, 40', while maintaining a closed seal to isolate the interior space 26 from exterior elements. Further, in underwater practice of the invention, the boots 38, 38' may serve as pressure barriers, wherein the interior space 26, which is in open communication with the space inside the boots 38, 38', may be pressurized with air pressure. Accordingly, air pressure may be confined and regulated within the tube of the vane 20 and the conjoined boots 38, 38' to prevent the entry of water therein and to provide, preferably, a neutral buoyancy of the vane 20 in underwater applications. A neutrally buoyant vane 20 in underwater applications provides enhanced performance as water pressure and gravity effects are minimized. Boots 38, 38' are optional in versions of the invention intended for use in the wind, but are strongly indicated in embodiments for use underwater.

FIG. 2 further indicates the provision within the vane 20 of one possible manner for generating electricity for the oscillatory motion of the vane 20. Disposed within the vane is a conventional generator 36, which may be fixedly mounted upon the beam 24. Operably connected to the mechanical input of the generator 36 is one end of a crankshaft 44, whose other end is secured to the beam 24. At least a pair of cranking rods 46, 46' have pivotal connection to the crankshaft 44. The radially interior end of each of the rods 46, 46' is pivotally connected to the crankshaft, while the radially exterior end of each rod is pivotally connected to the interior wall 22 of the vane 20. By the mechanical link between the vane 20 and the generator 36 provided by the rods 46, 46' and crankshaft 44, energy from the oscillating vane is transmitted to the generator 36, as shall shortly be further described.

Indicated in FIG. 2 is the use of bumper stops 48, 48' and 49, 49'. Bumper stops 48, 48' and 49, 49' are resilient pads, for example fashioned from rubber or the like, securely mounted upon the top and bottom of the beam 24. Bumper stops 48, 48' and 49, 49' function as cushion bumps against which the interior wall 22 of the vane 20 may make non-damaging contact or collision at the points of maximum displacement of the vane 20 at each half-cycle of oscillation. The maximum amplitude of vane oscillation thus is limited by the location and size of the bumper stops 48, 48' and 49, 49'.

Attention is invited to FIGS. 1, 2, 5A and 5B, which illustrate elements of the invention for limiting the motion of the vane 20 to unidimensional translational movement, wherein the longitudinal axes of the beam 24 or beams and the vane 20 remain parallel. Unidimensional translational movement means that when each vane 20 moves under the influence of the flowing fluid, the central axis of the vane remains generally within a single imaginary plane, and undergoes little or no rotational or angular movement. For example, in the embodiment shown in FIG. 1, the axis of the vane 20 remains within a generally vertical imaginary plane, as the vane 20 moves up and down with its axis remaining mostly parallel to the horizontal ground 30.

Figure 5A:
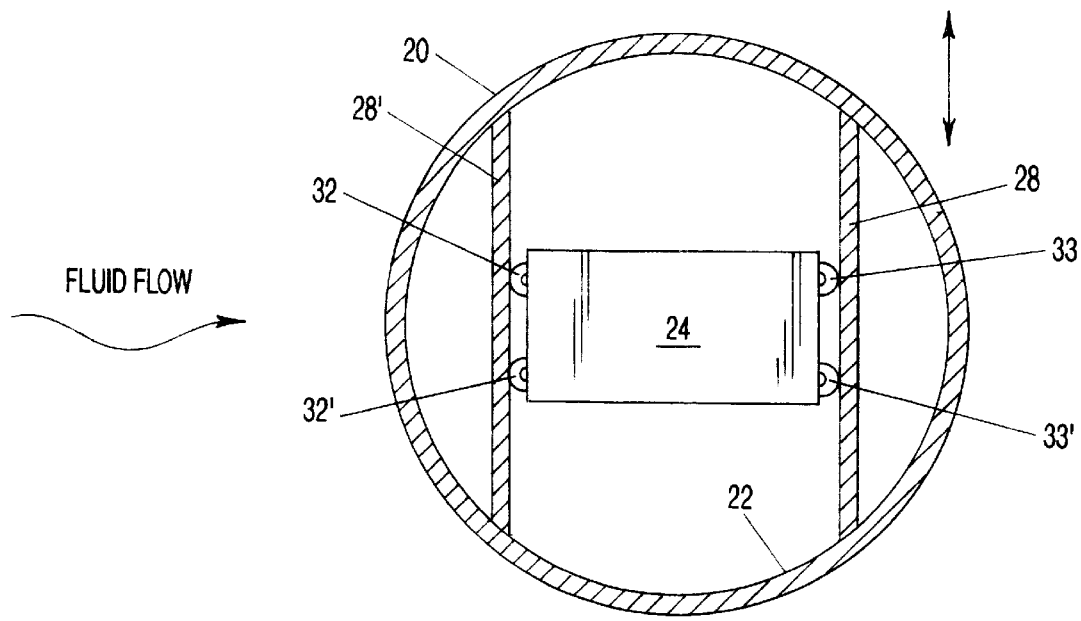
FIG. 5A is an enlarged radial sectional view of the embodiment of FIG. 2, taken substantially along section line 5A—5A in FIG. 2.

The elements for limiting the oscillatory motion of the vane 20 in the preferred embodiment are planar guide members within the interior space 26 which serve to maintain the orientation of the vane 20 with respect to the immovable beam 24. As seen in FIGS. 1 and 2, the beam 24 runs the complete length of the vane 20, and emerges from each end thereof for secure attachment to the piers 40, 40'. The radial sectional view of FIG. 5A shows that a pair of parallel guide members 28, 28' are mounted within the interior space 26 and upon the vane 20, on opposite sides of the beam 24. At least one, preferably more, rotatable bearings 32, 32' and 33, 33' are mounted upon opposing sides of the beam 24. The bearings 32, 32', 33, 33' are all in constant rolling contact with the guide members 28, 28'. Reference to FIG. 5A illustrates the arrangement, whereby the beam 24 does not move, yet the vane 20 is free to translate only in an up-and-down direction (as indicated by the directional arrows in the figure) as the guide members 28, 28' roll back-and-forth past the bearings 32, 32', 33, 33'. The contact of the bearings 32, 32', 33, 33' with the guide members 28, 28' prevents the vane 20 from shifting laterally (left or right in FIG. 5A). The bearings 32, 32', 33, 33' are fixed to rotate within one plane only, and do not pivot or roll to allow the vane 20 to shift or slide longitudinally, that is, in a direction parallel to the axis of the beam 24.

Figure 5B:
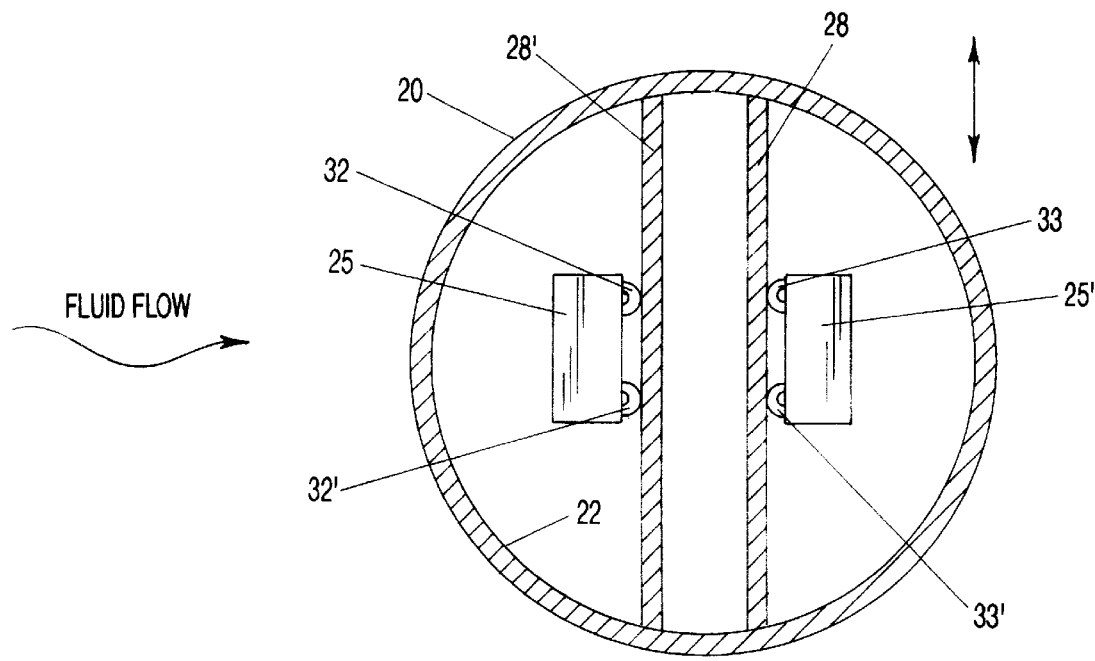
FIG. 5B is an enlarged radial sectional view of an alternative version of the embodiment shown in FIG. 5A.

An alternative means for limiting the motion of the vane 20 to a unidimensional translation is illustrated in FIG. 5B. This embodiment is the same as other embodiments in all respects except that two parallel beams 25, 25', instead of a single beam 24, are disposed longitudinally within the vane 20. A pair of parallel guide members 28, 28' are mounted within and upon the vane 20, and between the two beams 25, 25'. At least one, and preferably at least two rotatable bearings 32, 32', 33, 33' are mounted upon one side of each of the beams 25, 25', with the bearings in constant rolling contact with a respective ones of the guide members 28, 28'. Again, like the embodiment of FIG. 5A, FIG. 5B shows an arrangement whereby the beam 24 does not move, yet the vane 20 is free to translate only in an up-and-down direction perpendicular to the direction of the fluid flow. As indicated by the directional arrows in FIG. 5B, the vane 20 oscillates as the guide members 28, 28' roll back-and-forth past the bearings 32, 32', 33, 33'. The contact of the bearings 32, 32', 33, 33' with the guide members 28, 28' prevents the vane 20 from shifting laterally (left or right in FIG. 5B). The bearings 32, 32', 33, 33' are fixed to rotate within one plane only, and do not pivot or roll to allow the vane 20 to shift or slide longitudinally, that is, in a direction parallel to the axes of the two immovable beams 25, 25'.

Figure 4A:
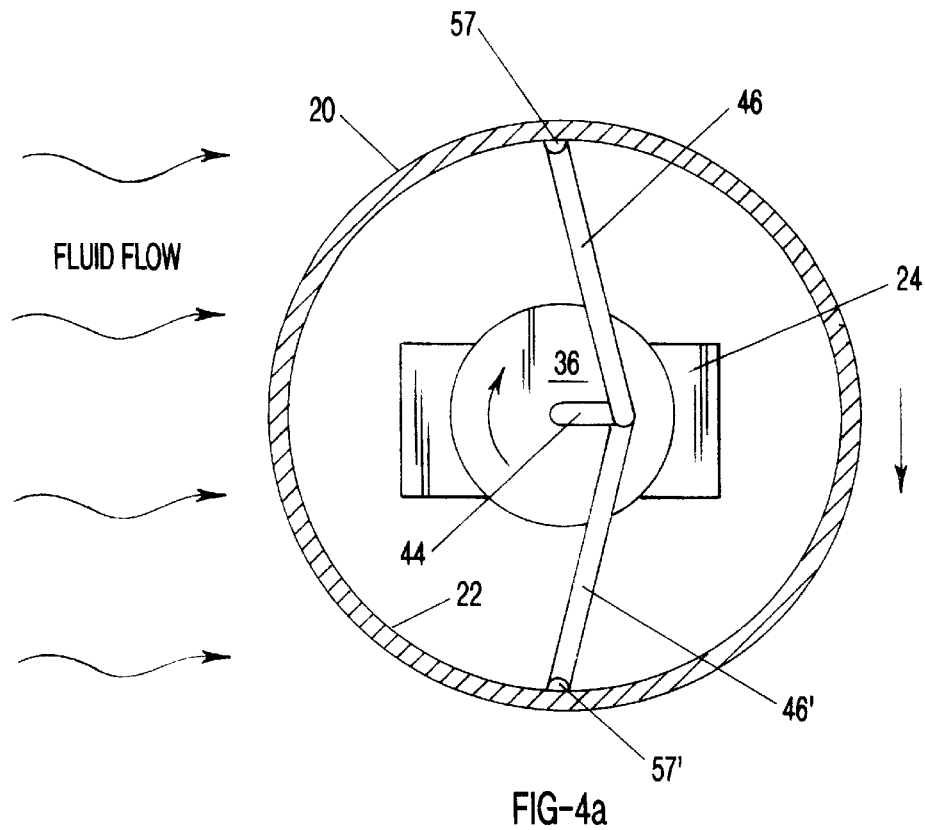
FIG. 4A is an enlarged radial sectional view of the embodiment shown in FIG. 2, taken substantially along section line 4A—4A in FIG. 2.
Figure 4B:
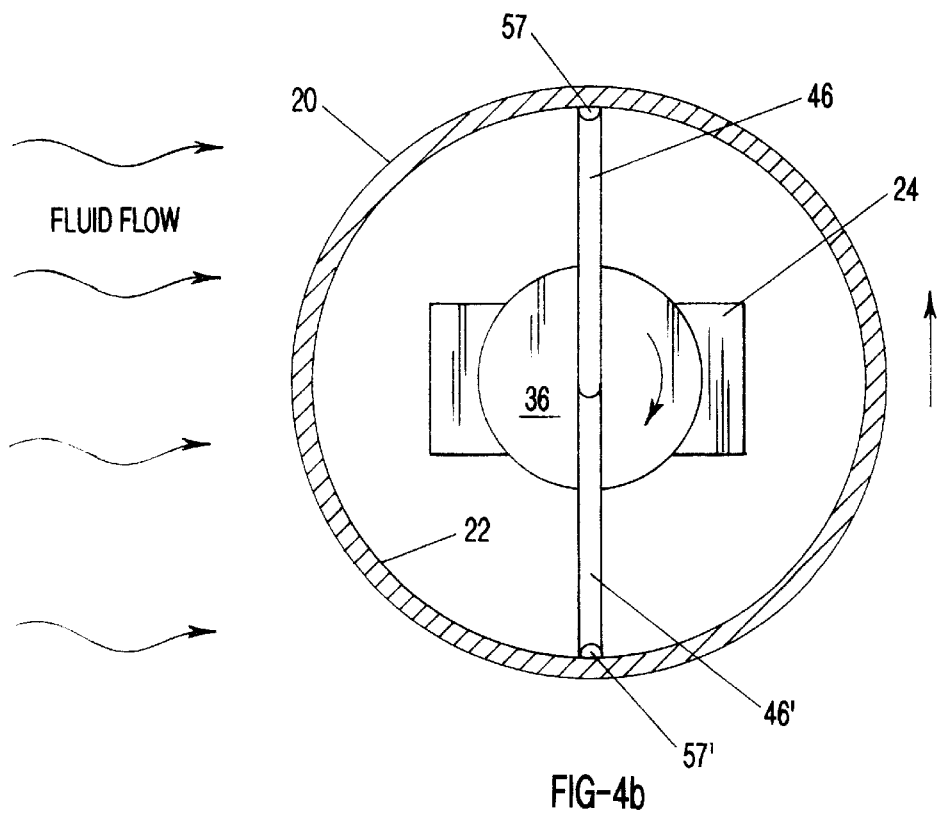
FIG. 4B is another view of the embodiment shown in FIG. 4A, taken later in time to show the displacement of the vane tube and the operation of the crankshaft.

Combined reference is made to FIGS. 1–4B, which show one set of elements of the apparatus for generating electrical energy from the movement of the vane 20 in relation to the beam 24 or beams 25, 25'. As mentioned, the flow of the fluid, such as wind or tidal waters, past the vane 20 causes the vane to oscillate in relation to the beam 24, according to general principles of aeolian oscillation. In FIGS. 4A and 4B there is illustrated a fluid flow from right to left in the figures), which may be, for example, the movement of air in a constant or gusting wind. The flow of the fluid around and past the tubular vane 20, which has the cylindrical cross-sectional profile seen in the figures, causes the vane 20 to move up and down, as indicate by the straight directional arrows of FIGS. 4A and 4B.

FIG. 3 indicates how the conventional generator 36 is immobile, for example by being mounted upon the beam 24. One end of the crankshaft 44 is connected to the generator 36 so that rotary motion of the crankshaft is transmitted to the generator, where the rotary mechanical energy is converted to electrical energy. The other end of the crankshaft 44 is rotatably secured, for example by a journal in a bearing box 52. At least two, as illustrated, or a plurality of pairs, of cranking rods 46, 46' mechanically connect the vane 20 to the crankshaft 44. Respective interior ends 54, 54' of the cranking rods 46, 46' are pivotally connected to corresponding offset portions of the crankshaft 44 in a conventional manner. The radially exterior ends 56, 56' of the cranking rods 46, 46' are pivotally connected, as by pin-and-knuckle connections 57, 57', to the interior wall 22 of the vane 20. As best illustrated by FIGS. 4A and 4B, the points of connection 57, 57' between the exterior ends of associated pairs of rods 46, 46' are located at diametrically opposite locations upon the interior wall 22.

Accordingly, as the vane 20 oscillates up and down under the influence of the moving fluid, the motion of the vane is transmitted to the generator 36 via the rods 46, 46' and the crankshaft 44. Seen in FIG. 4A, the vane 20 is moving downward, as indicated by the straight directional arrow. The downward motion places upper cranking rod 46 in compression and lower cranking rod 46' in tension, resulting in the clockwise motion of the entire crankshaft 44 as indicated by the curved directional arrow. In FIG. 4A the vane displacement is at a minimum, i.e., the vane 20 is generally coaxial with the beam 24 and generator 36. The vane 20 continues downward until it contacts bumper stops 48, 49, at which point it is at a location of maximum displacement seen in FIG. 4B. In FIG. 4B, the beam 24 is closer to the top of the vane 20 than to the bottom. The vane 20 then begins to move upward in aeolian oscillation, as indicated by the straight directional arrow in the figure, which continues to crank the generator 36 in the clockwise direction indicated by the curved directional arrow. The vane 20 continues moving upward under the force of the fluid flowing past, until the vane contacts the upper bumper stops 48', 49' at the other condition of maximum displacement. Downward motion resumes, and the cycle is repeated indefinitely, rotating the input into the generator 36, so long as fluid moving past the vane 20 induces aeolian motion. Electricity generated by the generator 36 is delivered to a power grid, batteries, or a load, or the like, for productive use.

The fluid forces that produce aeolian oscillation of a vane 20 in the direction perpendicular to fluid flow depends upon the fluid (e.g. water or air), the velocity of flow, and the vane 20 diameter per unit length. Accordingly, the number of generators 36 (and associated crankshaft assemblies) that can be mounted within and driven by a single vane 20 depends upon the length of the vane 20, the aeolian driving force, and the RPM indicated for optimum generator performance.

FIGS. 7 and 8 illustrate an alternative means according to the invention for generating electricity from the kinetic energy of a flowing fluid. In this alternative embodiment, electrical energy is generated by moving a flux field across one or more induction wires to induce an alternative current in the induction wires that can be delivered for use. This alternative embodiment requires some attention to materials selection for proper insulation and conductivity of the appropriate components, but presents advantages of decreased frictional and mechanical losses. This alternative embodiment thus is well suited for use in wind applications, where the aeolian driving forces are lesser than in the case with moving water. A field coil 60 is mounted upon the vane 20, as in a longitudinal looped configuration indicated in the figures, preferably upon but insulated from the upper and lower portions of the interior wall 22. The coil 60 may comprise one or more longitudinal wires having respective ends attached to the terminals of a battery, for example, or may be a multiple loop configuration of a single wire. A direct current is applied to the field coil 60 so that a current flows in the coil 60. The direct current at least initially is supplied from an exterior source, but may be continued by rectifying the alternating current induced in the induction wires 62, 62', 62", and applying that output to the field coil 60 before transmission to the utility.

At least one, or preferably a plurality of induction wires 62, 62', 62" are mounted longitudinally upon, and insulated from, the beam 24. In this embodiment, it is highly preferably that the beam 24 be fashioned entirely from a substantially non-conductive material, so that current in the induction wires 62, 62', 62" does not produce eddy currents in the beam 24, resulting in undesirable energy loss, including heat, from the system. Notably, the vane 20 can itself be crafted from a magnetic material, such as stainless steel, which serves as a electromagnetic shield. A vane 20 comprised of a magnetic material thus confines the direct current flux within the vane. As indicated by the directional arrow in FIG. 7, when the vane 20 oscillates in relation to the beam 24, the field coil 60 moves with it. The induction wires 62, 62', 62" move through the electrical flux emanating from the field coil 60, thereby inducing electrical current in the induction wires 62, 62', 62" according to known principles of physics. The current induced in the induction wires 62, 62', 62", depending upon which direction the vane is moving. As the vane 20 moves upward toward the upper portion of the coil 60, current is induced in one direction in the wires 62, 62', 62"; as the vane descends toward the lower portion of the coil 60, the direction of the induced current is reversed.

A return lead 63 is provided, preferably upon the vane 20, for closing the circuit containing the induction wires 62, 62', 62". The return lead 63 moves with the vane 20 to avoid canceling the induction in the induction wires. The return lead 63 may be connected to a rectifier (not shown) to provide current to the field coil 60 if desired.

Figure 6:
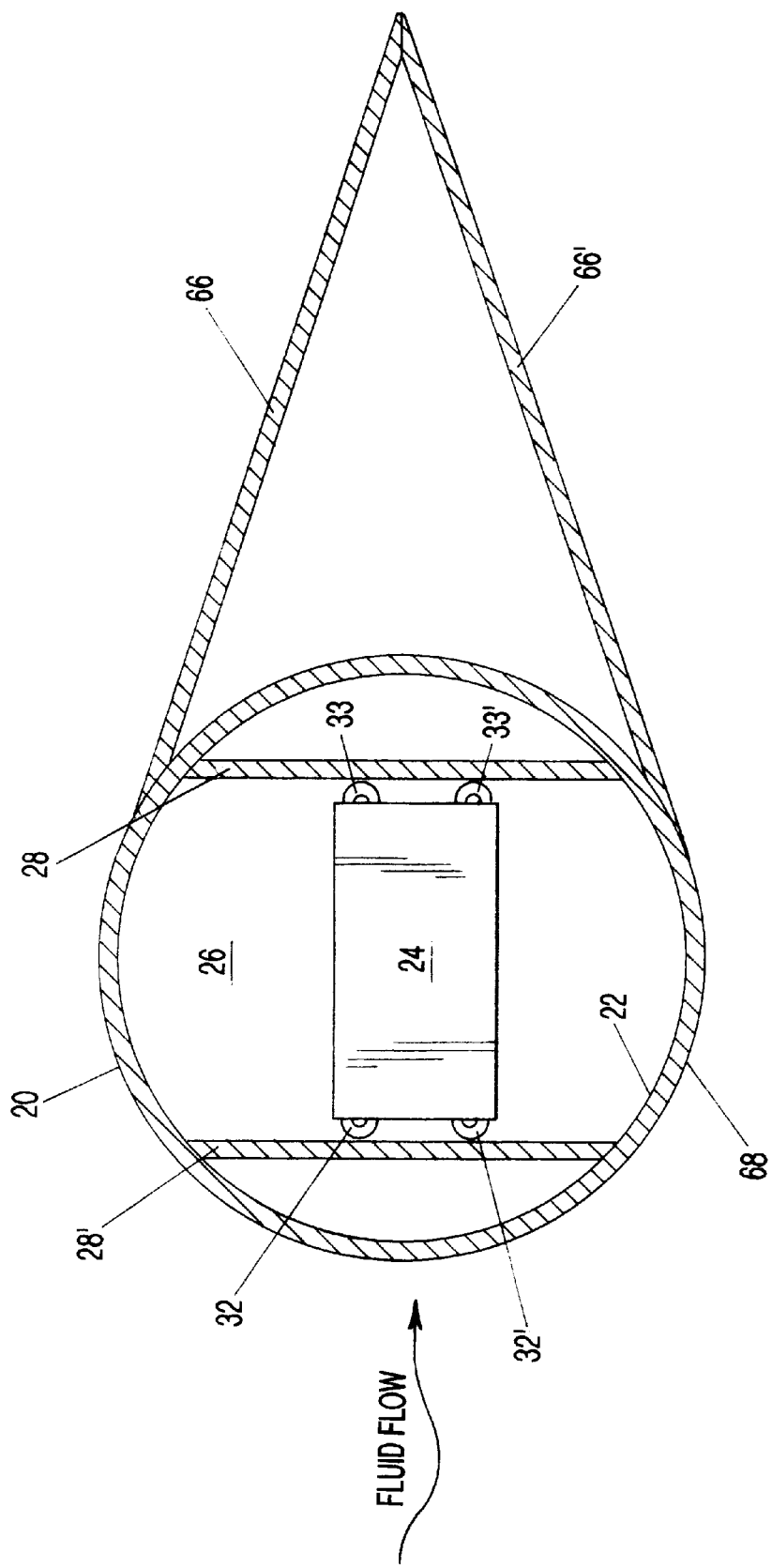
FIG. 6 is an enlarged radial sectional view of an alternative embodiment of the apparatus of the invention, similar to the embodiment shown in FIG. 5A, illustrating the use of extended foil plates.

FIG. 6 illustrates that the performance of the invention may be enhanced by the use of a vane 20 having a generally foil-shaped cross-sectional profile. The foil-shaped vane 20 can be economically constructed by fixedly mounting a pair of converging plates 66, 66' on the downstream side of a cylindrical tube 68. The foil shape of the vane 20 exploits the known aerodynamic forces that provide lift to fixed-wing aircraft, resulting in larger driving forces in the invention. As seen in FIG. 6, the tube 68 contains the beam 24, guide members 28, 28', and bearings 32, 32', 33, 33' as in previously described embodiments.

The apparatus of the invention may be disposed in any location where the prevailing winds or tidal or other water flows are reasonably consistent. The flowing fluid impacts each vane 20 and flows therearound and past, causing the vane 20 to move cyclically by aeolian oscillation. The oscillation of the vane 20 converts the kinetic energy of the flowing liquid into useable electricity, either by the cranking of one or more generators 36, or the repeatedly alternating passage of induction wires 62, 62', 62" through a direct current flux. The induced current flowing in the induction wires 62, 62', 62", or the output of the generators 36, may then be tapped and applied to conventional uses of electrical power.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for generating electricity from the kinetic energy of a flowing fluid in which the apparatus is located, said apparatus comprising:

at least one immovable beam;

a rigid tubular vane having an interior wall, said interior wall defining an interior space, and said tubular vane disposed around said at least one beam, wherein said beam is situated parallel within said vane, said vane movable in relation to said beam;

means for limiting the motion of said vane to unidimensional translational movement wherein the axes of said at least one beam and said vane remain parallel; and means for generating electrical energy from the movement of said vane in relation to said at least one beam; wherein the flowing of the fluid past said vane causes said vane to oscillate in relation to said beam.

2. An apparatus according to claim 1 further comprising a pair of support piers, wherein said beam fixedly extends between said piers.

3. An apparatus according to claim 2 wherein said piers are vertically disposed, and said beam extends horizontally between said piers.

4. An apparatus according to claim 2 further comprising flexible boots, one of said boots extending between each end of said vane and a corresponding one of said piers.

5. An apparatus according to claim 1 wherein said tubular vane comprises a substantially cylindrical cross sectional profile.

6. An apparatus according to claim 1 wherein said tubular vane comprises a foil-shaped cross-sectional profile.

7. An apparatus according to claim 1 wherein said means for limiting the motion of said vane comprises:

a pair of parallel guide members mounted within and upon said vane on opposite sides of said at least one beam; and rotatable bearings upon opposing sides of said beam, said bearings in constant contact with said guide members.

8. An apparatus according to claim 1 wherein said at least one beam comprises two parallel beams disposed longitudinally within said vane, and said means for limiting motion of said vane comprises:

a pair of parallel guide members mounted within and upon said vane and between said two beams;

rotatable bearing upon one side of each of said beams, said bearings in constant contact with said guide members.

9. An apparatus according to claim 1 wherein said means for generating electrical energy comprises:

a generator upon said beam;

a crankshaft operably connected to the mechanical input of said generator; and at least a pair of rods having their respective first ends connected to said crankshaft, and respective second ends pivotally connected to diametrically opposing points upon said interior wall of said vane; wherein when said vane oscillates in relation to said beam, said rods impart rotary motion to said crankshaft, causing said generator to produce electrical current.

* * * * *